(12) United States Patent
Cantone et al.

(10) Patent No.: US 6,617,965 B1
(45) Date of Patent: Sep. 9, 2003

(54) CONTROL OF THE LEVEL OF THE SIGNAL PRODUCED BY A TRANSCEIVER COUPLED TO A POWER DISTRIBUTION LINE

(75) Inventors: Giuseppe Cantone, Syracuse (IT); Roberto Cappelletti, Cornaredo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/676,689

(22) Filed: Sep. 29, 2000

(30) Foreign Application Priority Data

Sep. 30, 1999 (EP) .......................................... 99830618

(51) Int. Cl.[7] .......................................... H04M 11/04
(52) U.S. Cl. .................. 340/310.01; 340/660; 340/664
(58) Field of Search ................. 340/310.01, 310.06, 340/310.08, 662, 663, 664, 660

(56) References Cited

U.S. PATENT DOCUMENTS

| | | | |
|---|---|---|---|
| 3,558,917 A | * 1/1971 | Crouse | 307/235 |
| 4,451,801 A | 5/1984 | Monticelli | 330/278 |
| 4,639,652 A | * 1/1987 | Takahashi et al. | 318/568 |
| 5,200,708 A | * 4/1993 | Morris, Jr. et al. | 330/124 R |
| 5,862,238 A | * 1/1999 | Agnew et al. | 381/321 |
| 5,975,057 A | * 11/1999 | Repplinger et al. | 123/490 |

FOREIGN PATENT DOCUMENTS

EP  0267887  5/1988  ............ H03G/3/20

* cited by examiner

Primary Examiner—Brent A. Swarthout
(74) Attorney, Agent, or Firm—Lisa K. Jorgenson; Allen, Dyer, Doppelt, Milbrath & Gilchrist, P.A.

(57) ABSTRACT

A method for controlling the level of a signal produced by a transceiver of digital data coupled to a power distribution line during a transmission phase is provided. The level of the signal output by the transceiver is regulated by comparing the current level of the output signal with a predetermined minimum threshold and a predetermined maximum threshold, reducing the current level when the maximum threshold is exceeded by reducing the gain, and switching to a voltage mode control of the output signal when the current level of the output signal becomes lower than the minimum threshold.

32 Claims, 3 Drawing Sheets

CONTROL OF THE LEVEL OF THE SIGNAL PRODUCED BY A TRANSCEIVER COUPLED TO A POWER DISTRIBUTION LINE

FIELD OF THE INVENTION

The invention relates in general to data transmission systems, and, more particularly, to an interface circuit for coupling transceivers to power distribution lines.

BACKGROUND OF THE INVENTION

Electric power distribution networks are widely used throughout the world. It is well known that such networks are used for supplying power, but they may also provide a medium for transmitting data or other information. Such a medium is particularly advantageous for communicating with users located in remote areas. Since many of these users may already have appliances and instruments connected to a power distribution line, the costs of installing a dedicated line for conveying information may therefore be avoided.

This type of data transmission, commonly referred to as "conveyed waves," takes advantage of the fact that electric power is distributed with a well established frequency. That is, the transmission and reception of signals typically involves modulating the signal to be sent to a carrier frequency unoccupied by other signals. Therefore, it is possible to send on a single line (e.g., a power line) numerous signals on non-overlapping frequency bands, and the desired signal band may be separately selected during the reception phase.

The transmission of information on power distribution lines is well suited for sending control signals to a particular site for the appliances installed at that site, which avoids the need for telephone lines or radio transmissions. Yet, transmission or reception of data signals on a power distribution line requires a suitable interface circuit between the line and the transceiver to efficiently inject a modulated carrier in the power distribution line. One of the problems associated with transmitting information on power lines is that the impedance of the medium of transmission is not constant, and the variations may be of several orders of magnitude depending on the presence or absence of loads connected to the power line.

In order to reduce the problems associated with variable line impedance, the document DH028 issued by ENEL in September 1992 states that in Italy the control of the level of the signal output by a transceiver coupled to a power distribution line should be implemented in a current mode when the impedance is below a certain value (i.e., 5Ω) and in a voltage when the impedance is above that value. Current interface circuits can either control the level in current mode or in voltage mode, as described in U.S. Pat. No. 4,636,771, and therefore they must be chosen as a function of the prevailing line impedance condition.

There is a need for an interface circuit that monitors the impedance of the line and switches automatically from a current mode to a voltage mode of controlling the signal to be conveyed on a power distribution line and vice-versa, depending on the actual impedance of the line.

SUMMARY OF THE INVENTION

It is an object of the present invention to provide a new method and related circuit for controlling the level of the output signal produced by a transceiver of digital data coupled to a power distribution line capable of switching automatically from a current mode to a voltage mode and vice-versa, depending on a detected impedance of the distribution line.

This and other objects, features, and advantages in accordance with the present invention are provided by a method for controlling the level of a signal produced by a transceiver of digital data coupled to a power distribution line during a transmission phase. The method may include comparing the current level of the signal with a predetermined minimum value and a predetermined maximum value, reducing the current level when it exceeds the maximum value by reducing a current gain, and switching to a voltage control mode when the current level becomes lower than the minimum value and until the current level exceeds the minimum value. Switching to the voltage control mode may include comparing the voltage level (Vref) of the signal with high and low predetermined thresholds and regulating a voltage gain.

A coupling interface for a transceiver of digital information coupled to a power distribution line for controlling the level of a signal transmitted on the line during a transmission phase is also provided. The coupling interface may include a voltage amplifier having a gain controlled as a function of a digital control datum or signal and having an input coupled to the signal to be transmitted and a current amplifier coupled to the output of the voltage amplifier delivering the signal to the power distribution line. The coupling interface may also include a first pair of comparators for comparing the voltage on a current sensing resistor in series with the output of the current amplifier with a first pair of predetermined high and low thresholds and producing a first pair of first and second logic signals, a second pair of comparators comparing a signal representing the output voltage of the current amplifier with a second pair of predetermined high and low thresholds and producing a second pair of third and fourth logic signals, and a control logic circuit receiving as an input the first and second pairs of logic signals and outputting the digital control signal.

The digital control signal may be set to reduce the gain of the voltage amplifier if the first logic signal assumes a false logic value. Further, the digital control signal may be set to maintain the gain if the first logic signal and the second logic signal assume a true logic value. Also, the digital control signal may increase, decrease, or maintain the gain when the second logic signal assumes a false logic value, if the fourth logic signal or the third logic signal assumes a false logic value, or the third logic signal and the fourth logic signal assume a true logic value, respectively. A true logic value is assumed by the first logic signal and by the third logic signal when the relevant signal does not exceed the high threshold, while a true logic value is assumed by the second logic signal and by the fourth logic signal when the relevant signal exceeds the lower threshold.

BRIEF DESCRIPTION OF THE DRAWINGS

The various aspects and advantages of the invention will become even more evident from the description of an embodiment and by referring to the attached drawings, wherein.

DETAILED DESCRIPTION OF THE PREFERRED EMBODIMENTS

Figure 1:
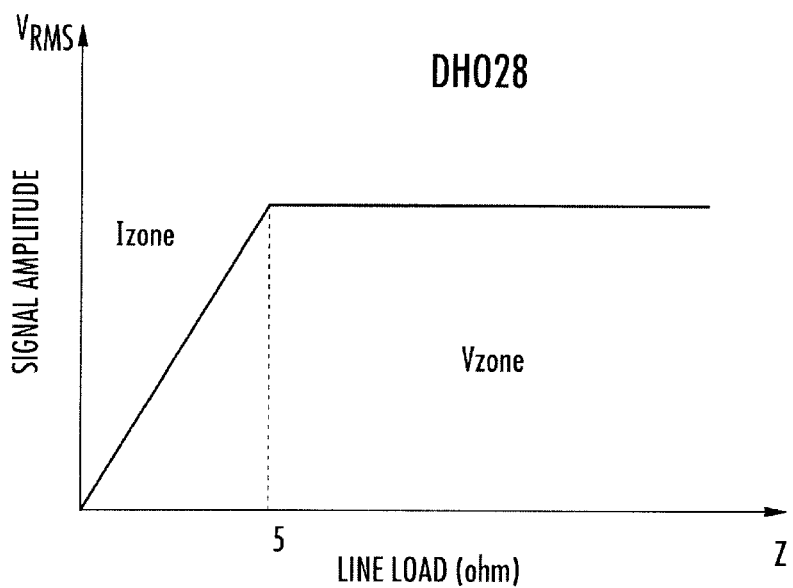
FIG. 1 is a graph of a line impedance-voltage level of a transmitted signal according to the prior art.

ENEL specifications call for a transmission characteristic according to which the output signal should be kept at a constant voltage level of 1 to 2 $V_{EFF}$ if the line impedance is greater than 5W, or at a current level of 200 to 400 $mA_{EFF}$ if the line impedance is lower than 5W. This recommended transmission characteristic is shown in FIG. 1, where the waveforms of the effective value of the voltage signal to be transmitted on the line depending on the line impedance are shown.

Figure 2:
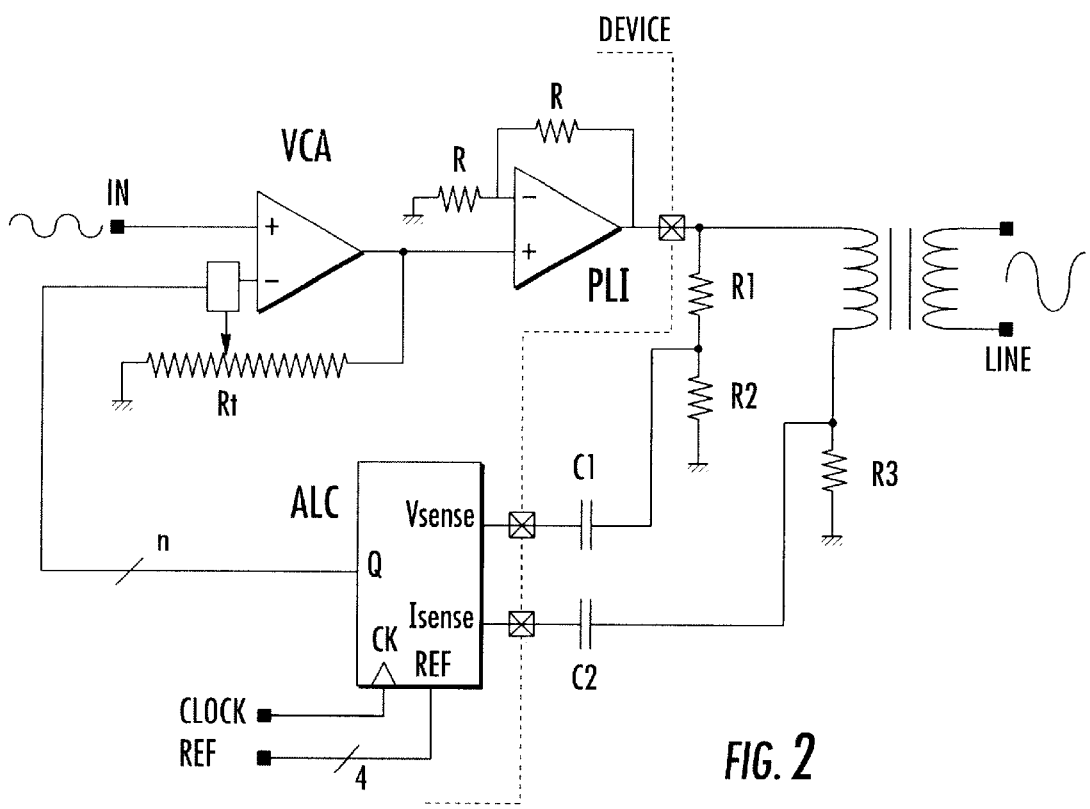
FIG. 2 is a schematic diagram of an embodiment of an interface according to the present invention.

Operation of the present invention will now be described with reference to an embodiment of a single-ended output driver, as seen in FIG. 2. Of course, those of skill in the art will appreciate that the concepts described herein may be equally applicable to other output drivers, such as a fully differential amplifying structure, for example. The interface circuit according to the present invention detects two magnitudes Vsense and Isense, respectively representing the voltage level and the current level of the signal to be coupled to the transmission line. As shown in FIG. 2, this may be done by deriving a scaled replica of the output voltage signal using a voltage divider (e.g., the resistors R1 and R2 connected in series) connected in parallel to the output, and obtaining an Isense voltage signal proportional to the current level of the output signal by placing a current sensing resistor R3 in series with the output.

Naturally, other methods for producing the signals Vsense and Isense may be used, such as using other equivalent integrated components instead of resistors, for example. Moreover, since these signals need only represent the voltage and current on a load, respectively, any signal that satisfies such a requisite in the interface may be detected. For example, instead of detecting the output current through a sensing resistor crossed by the load current, a representative value of the output current may be obtained by using current mirrors drawing current from the output buffer of the interface (PLI).

The Vsense and Isense signals are compared in a control circuit with respective threshold pairs that define the permitted maximum and minimum values of the variation interval of the current level and of the voltage level of the output signal to be coupled to the power line. According to the invention, the control logic circuit produces a digital datum N that is input to a Voltage Controlled Amplifier (VCA). The VCA receives the signal to be transmitted on the IN input and amplifies this signal by a quantity established by the digital datum N. This amplified signal is then provided to a second amplifier having a high current gain. At the output of the interface PLI, the signal is coupled to the power line.

Figure 3:
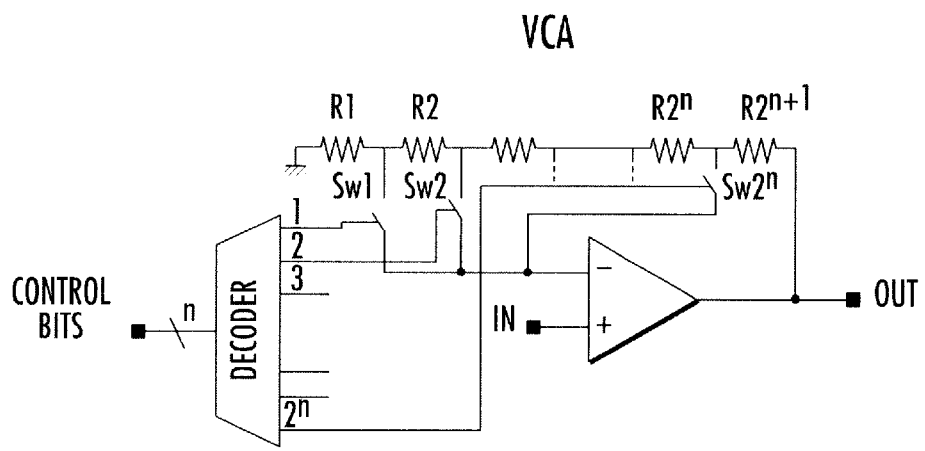
FIG. 3 is schematic diagram of a gain controlled voltage amplifier according to the present invention.

The circuit of the VCA may be as shown in FIG. 3. The illustrated circuit includes an operational amplifier with a negative feedback path including a series of resistors forming a voltage divider. These resistors are connected or disconnected to an inverting input of the operational amplifier by a series of switches. The digital datum N produced by the control circuit is fed to a decoder which correspondingly controls the switches of the voltage divider for modifying the feedback and thereby the voltage gain.

Figure 4:
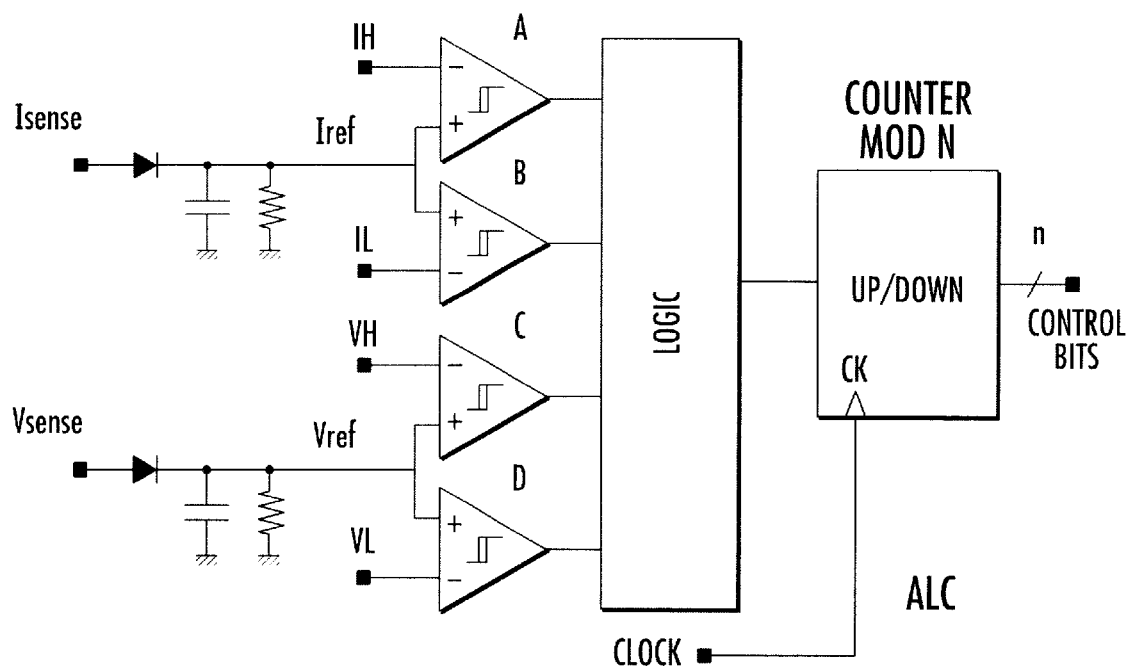
FIG. 4 is a schematic diagram of a circuit for producing a digital datum N from a signal representing the level of the modulated signal to be transmitted on the line.

A possible embodiment of the control system is illustrated in FIG. 4. Vsense and Isense are alternate signals because they are proportional to the voltage level and to the current level of the signal being coupled to the power line, respectively. These signals are rectified and integrated to obtain DC signals Vref and Iref proportional to their respective amplitudes. This is done by using a diode connected in series with a low pass R-C filter, for example, or by using any other circuit outputting a DC voltage proportional to the amplitude of the respective alternate input signal.

Iref and Vref are then compared with respective high and low thresholds by four comparators that produce the logic signals A, B, C, D. The LOGIC block processes the signals output by the comparators and controls an Up/Down counter whose output provides the digital datum N. The counting of the Up/Down counter is timed by a clock signal having a lower frequency than the frequency of the modulating signals.

Figure 5:
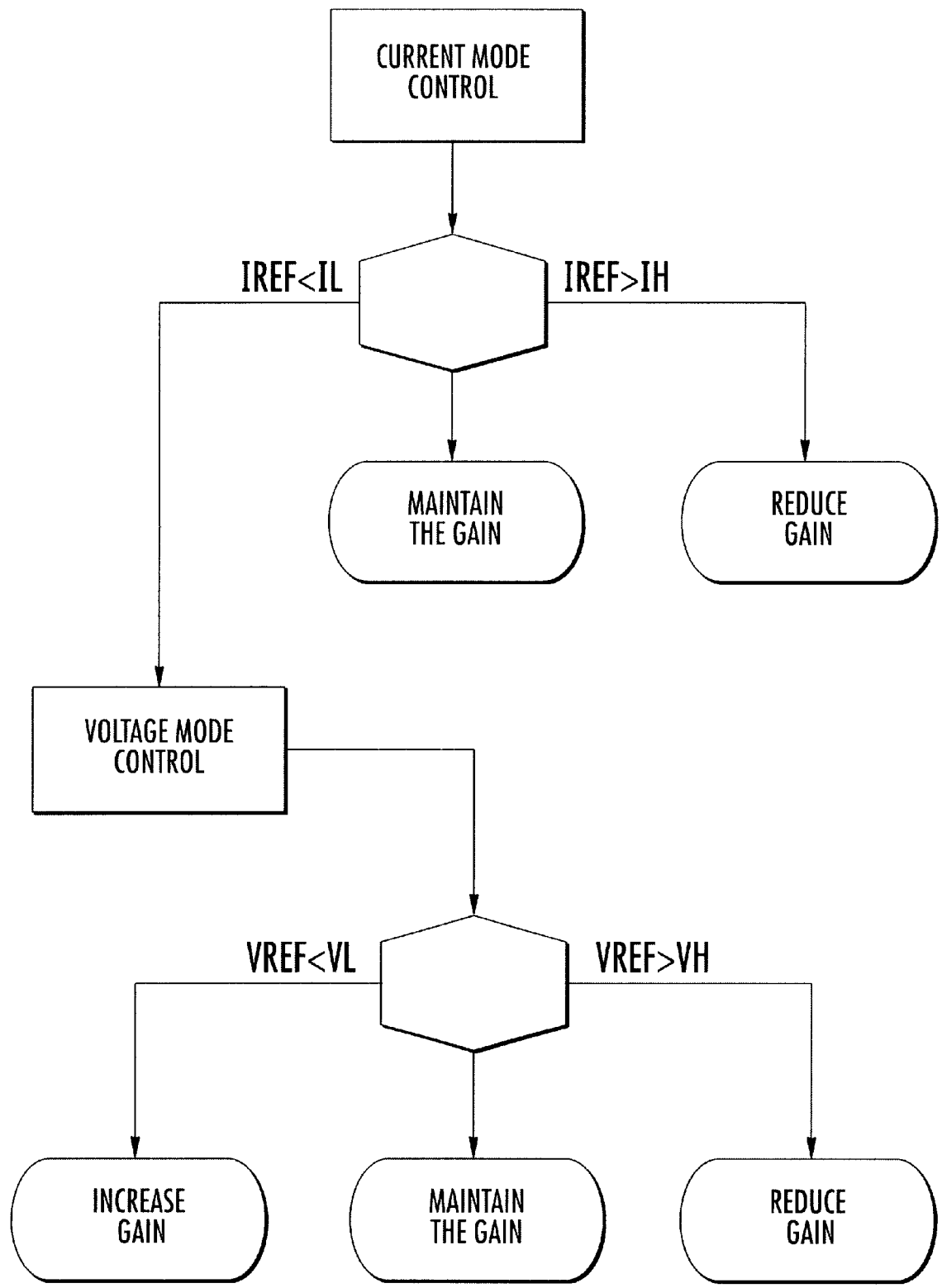
FIG. 5 is a flow chart of the algorithm implemented by the control logic circuit.

An algorithm for implementation by the control logic circuit is illustrated in FIG. 5. At the start, the possibility of implementing a current mode control is assessed by comparing Iref with the high and low thresholds IH and IL, respectively. If Iref is greater than the low threshold IL, the current gain is kept constant or reduced depending on whether Iref is lower or higher than the IH high threshold. If Iref is lower than IL, (i.e., if the current level of the signal coupled to the output is lower than a minimum value) then the impedance of the distribution line is higher than the maximum value established for using a current mode control and it is necessary to switch to a voltage mode control. The voltage mode control may be implemented by varying the voltage gain of the VCA so that the signal Vref remains between the VL and VH thresholds.

That which is claimed is:

1. A method of regulating an output signal level for a transmitter connected to a power distribution line, the method comprising:

comparing a current of the output signal with a minimum current threshold and a maximum current threshold;

reducing the current of the output signal when the maximum threshold is exceeded; and switching to a voltage control mode for controlling the output signal when the current of the output signal is lower than the minimum threshold.

2. The method of claim 1, wherein reducing the current comprises reducing a gain of the output signal.

3. The method of claim 1 wherein switching to the voltage control mode further comprises comparing a voltage of the output signal with a low voltage threshold and a high voltage threshold and regulating a gain of the output signal to maintain the voltage within the low and high voltage thresholds.

4. The method of claim 3 wherein the low voltage threshold is less than about 1 V.

5. The method of claim 3 wherein the high voltage threshold is greater than about 2 V.

6. The method of claim 1 wherein the minimum current threshold is less than about 200 mA.

7. The method of claim 1 wherein the maximum current threshold is greater than about 400 mA.

8. A method of regulating an output signal level for a transceiver of digital information connected to a power distribution line during a transmission phase, the method comprising:

comparing a current of the output signal with a minimum current threshold and a maximum current threshold;

reducing the current of the output signal when the maximum threshold is exceeded by reducing a gain of the output signal; and switching to a voltage control mode for controlling the output signal when the current of the output signal is lower than the minimum threshold.

9. The method of claim 8 wherein switching to the voltage control mode comprises comparing a voltage of the output signal with a low voltage threshold and a high voltage threshold and regulating the gain to maintain the voltage within the low and high voltage thresholds.

10. The method of claim 9 wherein the low voltage threshold is less than about 1 V.

11. The method of claim 9 wherein the high voltage threshold is greater than about 2 V.

12. The method of claim 8 wherein the minimum current threshold is less than about 200 mA.

13. The method of claim 8 wherein the maximum current threshold is greater than about 400 mA.

14. A device for regulating an output signal level for a transmitter connected to a power distribution line, the device comprising:

a voltage amplifier receiving the signal and having a gain controlled by a control signal;

a current amplifier coupled to an output of said voltage amplifier and delivering the signal to the transmission line;

a current sensor connected to an output of said current amplifier;

at least one first comparator for comparing a voltage on the current sensor with first predetermined high and low thresholds and providing first and second logic signals; and at least one second comparator for comparing a signal corresponding to an output voltage of said current amplifier with second predetermined high and low thresholds and providing third and fourth logic signals; and a control logic circuit receiving the first, second, third, and fourth logic signals and outputting the control signal.

15. The device of claim 14 wherein the first signal has first and second logic values associated therewith; and wherein the control signal is set to reduce the gain if the first signal assumes the first logic value.

16. The device of claim 14 wherein the first and second logic signals each have first and second logic values associated therewith; and wherein the control signal is set to maintain the gain if the first and second logic signals assume the second logic value.

17. The device of claim 14 wherein the current sensor comprises a current sensing resistor.

18. The device of claim 14 wherein the current sensor comprises a current mirror.

19. The device of claim 14 wherein said current sensor is connected in series to the output of said current amplifier.

20. The device of claim 14 wherein the at least one first comparator comprises a pair of comparators; and wherein one of said pair of comparators compares the voltage on the current sensor with the first predetermined high threshold and provides the first logic signal; and wherein the other of said pair of comparators compares the voltage on the current sensor with the first predetermined low threshold and provides the second logic signal.

21. The device of claim 14 wherein the at least one second comparator comprises a pair of comparators; and wherein one of said pair of comparators compares the signal corresponding to the output voltage with the second predetermined high threshold and provides the third logic signal; and wherein the other of said pair of comparators compares the signal corresponding to the output voltage with the second predetermined low threshold and provides the fourth logic signal.

22. The device of claim 14 wherein the first, second, third, and fourth control signals have first and second logic values associated therewith; and wherein the control signal is set to increase the gain when the second and fourth signals assume the first logic value; wherein the control signal is set to decrease the gain when the second and third signals assume the first logic value; and wherein the control signal is set to maintain the gain when the second signal assumes the first logic value and the third and fourth signals assume the second logic value.

23. A device for regulating an output level for a transmitter connected to a power distribution line, the device comprising:

at least one comparator for comparing a current of the output signal with a minimum current threshold and a maximum current threshold;

a circuit for reducing the current of the output signal when the maximum threshold is exceeded; and a controller for switching the device to a voltage control mode for controlling the output signal when the current of the output signal is lower than the minimum threshold.

24. The device of claim 23 wherein the circuit reduces the current by reducing a gain of the output signal.

25. The device of claim 23 wherein the minimum current threshold is lower than about 200 mA.

26. The device of claim 23 wherein the maximum current threshold is greater than about 400 mA.

27. A coupling interface for a transceiver of digital information coupled to a power distribution line for regulating the level of a signal to be transmitted on the power distribution line during a transmission phase, the coupling interface comprising:

a voltage amplifier receiving the signal and having a gain controlled by a digital control signal;

a current amplifier coupled to an output of said voltage amplifier and delivering the signal to be transmitted to the power distribution line;

a current sensor connected in series to an output of said current amplifier;

a first pair of comparators for comparing a voltage on the current sensor with a first pair of predetermined high and low thresholds and providing a first pair of first and second logic signals;

a second pair of comparators for comparing a signal corresponding to an output voltage of said current amplifier with a second pair of predetermined high and low thresholds and providing a second pair of third and fourth logic signals; and a control logic circuit receiving the first and second pairs of logic signals and outputting the digital control signal.

28. The coupling interface according to claim 27 wherein the first signal has first and second logic values associated therewith; and wherein the digital control signal is set to reduce the gain if the first signal assumes the first logic value.

29. The coupling interface according to claim 27 wherein the first and second logic signals each have first and second logic values associated therewith; and wherein the digital control signal is set to maintain the gain if the first and second logic signals assume the second logic value.

30. The device of claim 27 wherein the current sensor comprises a current sensing resistor.

31. The device of claim 27 wherein the current sensor comprises a current mirror.

32. The coupling interface according to claim 27 wherein the first, second, third, and fourth control signals have first and second logic values associated therewith; and wherein the digital control signal is set to increase the gain when the second and fourth signals assume the first logic value; wherein the digital control signal is set to decrease the gain when the second and third signals assume the first logic value; and wherein the digital control signal is set to maintain the gain when the second signal assumes the first logic value and the third and fourth signals assume the second logic value.

* * * * *